US008617400B2

(12) United States Patent
Sauvignet et al.

(10) Patent No.: US 8,617,400 B2
(45) Date of Patent: Dec. 31, 2013

(54) WATER TREATMENT PROCESS AND PLANT USING BALLASTED FLOCCULATION AND SETTLING

(75) Inventors: Philippe Sauvignet, Saint-Etienne-en-Cogles (FR); Claus Dahl, Hedehusene (DK); Valey Ursel, Les Pavillons Sous Bois (FR); Celine Levecq, Conflans Sainte Honorine (FR); Jean-Francois Beaudet, Montreal (CA)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 689 days.

(21) Appl. No.: 12/521,154

(22) PCT Filed: Dec. 26, 2007

(86) PCT No.: PCT/EP2007/064547
§ 371 (c)(1),
(2), (4) Date: Jun. 25, 2009

(87) PCT Pub. No.: WO2008/083923
PCT Pub. Date: Jul. 17, 2008

(65) Prior Publication Data
US 2010/0096335 A1 Apr. 22, 2010

(30) Foreign Application Priority Data

Dec. 29, 2006 (FR) .................................. 06 11562

(51) Int. Cl.
*C02F 1/52* (2006.01)
*B01D 21/01* (2006.01)
*B01D 21/02* (2006.01)
*B01D 21/08* (2006.01)
*B01D 21/34* (2006.01)

(52) U.S. Cl.
USPC ........... 210/709; 210/711; 210/712; 210/713; 210/714; 210/724; 210/726; 210/738; 210/739; 210/745

(58) Field of Classification Search
USPC ......... 210/709, 711–714, 724–727, 738, 739, 210/745, 772
See application file for complete search history.

(56) References Cited

U.S. PATENT DOCUMENTS

| 4,927,543 A | 5/1990 | Bablon et al. |
| 5,730,864 A | 3/1998 | Delsalle et al. |

(Continued)

FOREIGN PATENT DOCUMENTS

| EP | 0707520 | 4/1996 |
| FR | 2627704 | 9/1989 |

(Continued)

*Primary Examiner* — John Kim
(74) *Attorney, Agent, or Firm* — Coats and Bennett, PLLC

(57) ABSTRACT

A method for treating wastewater using a ballasted flocculation technique includes continuously measuring the concentration of suspended solids, organic matter or other impurities in the water to be treated prior to directing the water to be treated to a flocculation tank. Based on this measurement, the amount of ballast necessary to obtain treated water of a predetermined quality is then calculated. In the flocculation tank, ballast and a flocculating reagent are added to the water to form a water-floc mixture. The water-floc mixture is directed to a settling tank where a sludge-ballast mixture is settled. The sludge-ballast mixture is directed to a mixing tank and then to a separator to separate the ballast from the sludge. The separated ballast is directed to the flocculation tank. The separated sludge is directed to the mixing tank when the level of sludge-ballast mixture in the mixing tank is lower than a predetermined level.

18 Claims, 4 Drawing Sheets

(56) References Cited

U.S. PATENT DOCUMENTS

| | | | |
|---|---|---|---|
| 5,840,195 A | 11/1998 | Delsalle et al. | |
| 6,010,631 A | 1/2000 | Delsalle et al. | |
| 6,277,285 B1 * | 8/2001 | Vion | 210/709 |
| 6,645,386 B1 * | 11/2003 | Moreau et al. | 210/711 |
| 6,824,692 B2 * | 11/2004 | Binot et al. | 210/709 |
| 6,919,031 B2 * | 7/2005 | Blumenschein et al. | 210/711 |
| 7,001,525 B2 * | 2/2006 | Binot et al. | 210/709 |
| 7,311,841 B2 * | 12/2007 | Binot et al. | 210/666 |
| 7,648,637 B1 * | 1/2010 | Sauvignet et al. | 210/661 |
| 7,648,638 B2 * | 1/2010 | Essemiani et al. | 210/712 |

FOREIGN PATENT DOCUMENTS

| | | |
|---|---|---|
| FR | 2719234 | 11/1995 |
| WO | 9814258 | 4/1998 |
| WO | 0140121 | 6/2001 |
| WO | 03053862 | 7/2003 |

* cited by examiner

WATER TREATMENT PROCESS AND PLANT USING BALLASTED FLOCCULATION AND SETTLING

This application is a U.S. National Stage application of PCT Application No. PCT/EP2007/064547, with an international filing date of Dec. 26, 2007. Applicant claims priority based on French application serial. no. 06/11562 filed Dec. 29, 2006. Both applications are incorporated herein in their entirety.

This invention relates to the field of water treatment.

Water treatment, primarily the potabilisation of water and the treatment of urban or industrial wastewater to be depolluted, frequently uses a process consisting of coagulating the water filled with impurities to be treated with a coagulant often constituted by a trivalent metal salt, flocculating the coagulated water with a flocculating reagent usually constituted by an organic polymer, and settling the floc formed in a settling tank, the sludge being partially extracted from the bottom portion of the settling tank, and the treated water being extracted from the top portion of the settling tank.

Such a technique makes it possible to remove the dissolved or suspended colloidal impurities constituted by organic matter, micropollutants and microorganisms, in particular, from the treated water.

The invention more specifically relates to technology referred to as flocculation-settling with ballasted floc, which implements a ballast constituted by a fine and dense granular material such as microsand, for example, injected into the flocculation zone, in order to increase the speed of floc formation, serving as a flocculation initiator, and also to increase, by increasing the density, the rate of settling of the floc formed during the flocculation phase, which makes it possible to reduce the size of the structures.

In practice, the coagulated water is placed in contact in a reactor with a flocculating reagent, such as a polymer, and a ballast, and closely mixed therewith by agitation means. The time of contact between the water with the flocculant and the ballast must be sufficient to allow for the formation and increase in size of the floc constituted by the aggregated impurities by means of the flocculant around the ballast.

Microsand, with a mean diameter of between around and 400 micrometers, and usually 80 and 300 micrometers, is the ballast used most often for reasons of availability and cost.

The ballasted flocculation-settling technology is described in particular in the following patents:
  patent application FR-A-2627704, published on 1 Sep. 1989;
  patent application FR-A-2719234, published on 3 Nov. 1995.

In this technology, the ballast is usually separate from the sludge extracted from the settling structure so as to be capable of being recycled, by recirculation means, in the process.

During the recycling, a small portion of the ballast goes with the sludge. It is therefore necessary to periodically inject new ballast intended to compensate for the loss of ballast.

It is important to control the loss of ballast with the sludge in order to minimise the amount spent on new ballast. In addition, excessive recirculation can cause a deterioration in the quality of the sludge extracted, i.e. it can result in excessively-diluted extracted sludge, corresponding to "water losses".

To minimise these losses, the separation of the ballast from the sludge in order to recycle said ballast in the process is generally performed by hydrocyclone separation of the sludge/ballast mixture.

However, the risks of hydrocyclone malfunction increase rapidly beyond a given solids content in the underflow (often around 40% solid by volume).

Finally, significant ballast losses may take place when the underflow of the hydrocyclone is clogged, and the ballast then goes in overflow.

In an attempt to solve these problems, the prior art, namely patent application WO-A-03053862, published on 3 Jul. 2003, suggests pump extracting the mixture of sludge and ballast from the bottom portion of the settling tank and routing it to an agitated intermediate mixing zone, extracting the mixture of sludge and ballast present in said intermediate mixing zone and subjecting it to a step of sludge/ballast separation by hydrocyclone separation, and recirculating a portion of the sludge by adjusting the rate of said recirculation.

However, the implementation of this technique quickly leads to a deterioration in the quality of the treated water, if it is desirable to implement the step of separation of the ballast and the sludge under conditions leading to the recycling, in the flocculation zone, of the cleanest possible ballast. Indeed, the influx of additional solids tends to pollute the quality of the treated water.

In any case, this process described in WO-A-03053862, as well as those described in FR-A-2627704 and FR-A-2719234 do not make it possible to optimise the amounts of ballast to be implemented according to the load of material to be flocculated from the water to be treated. This optimisation would make it possible simultaneously to:
  perform the flocculation of impurities to be removed,
  minimise the ballast losses,
  reduce the water losses,
  obtain high-quality treated water,
  without considerably increasing the energy needed for the formation of floc and for the recirculation of sludge.

The objective of this invention is to provide a technique making it possible to approach or to achieve such an optimisation.

This objective is achieved by the invention, which relates to a process for treating water filled with dissolved or suspended colloidal impurities, in a treatment plant, including steps consisting of:
  contacting, in a flocculation zone, said water, at least one ballast constituted by at least one insoluble granular material that is heavier than water, and at least one flocculating reagent so as to enable the floc to form;
  introducing the mixture of water and floc thus formed into a settling zone;
  separating the water treated in the top portion of said settling zone from a sludge and ballast mixture in the bottom portion of said settling zone and routing it to an agitated intermediate mixing zone;
  extracting the mixture of sludge and ballast present in said intermediate mixing zone and subject it to a step of sludge/ballast separation by hydrocyclone separation,
  recycling the underflow of the hydrocyclone separation step in said flocculation zone;
  extracting a portion of the sludge coming from the overflow of the hydrocyclone separation step and recirculating the other part of said sludge in said agitated intermediate mixing zone;
  characterised in that it includes:
  a step consisting of continuously measuring at least one parameter representing the concentration of impurities in the water before or when it enters said flocculation zone;

a step consisting of using the results of said measurement thus performed so as to continuously deduce the amount of ballast that needs to be implemented to obtain treated water of a predetermined quality.

Such a process makes it possible to know, at any time, the amount of ballast needed according to the pollutant load to obtain the flocculation of the entire pollutant load while minimising the losses of ballast.

The process according to the invention preferably includes:
a step consisting of continuously measuring the ballast concentration in the mixture extracted from said settling zone or in the mixture present in said flocculation zone;
a step consisting of deducing, from the continuous measurement of the concentration of mixture extracted from said settling zone, the concentration of ballast actually present in said plant;
a step consisting of refilling the flocculation zone with ballast when said concentration of ballast actually present in said plant is lower than a predetermined threshold.

According to an advantageous alternative, said step consisting of refilling the flocculation zone with ballast when said amount of ballast actually present in said plant is lower than a predetermined threshold is performed automatically.

The process also advantageously includes a step consisting of using the results of said measurement of said at least one parameter representing the concentration of impurities in the water so as also to deduce the amount of said flocculating reagent that needs to be dispensed into the flocculation zone in order to obtain treated water having said predetermined quality.

According to an alternative, the process also includes a preliminary step consisting of continuously injecting into said water, before it enters the flocculation zone, at least one coagulating reagent according to a predetermined amount, and, as the case may be, at least one reagent intended to adjust its pH according to a predetermined amount. This step of injecting the coagulating reagent and adjusting the pH is very generally necessary. However, there are occasional cases in which it is not absolutely essential, in particular when the water to be treated contains very little organic matter.

Said parameter representing the concentration of impurities in the water used to implement the proposed process is preferably the concentration (X) of the so-called "overall SS" or overall suspended solids in the water, with the so-called "overall SS" concentration being calculated by taking into account all or some of the following parameters:
the concentration in said water of suspended solids,
the concentration in said water of organic matter,
the concentration of microorganisms in the raw water,
the concentration of micropollutants in the raw water,
said predetermined amount of coagulating reagent,
said predetermined amount of reagent intended to adjust the pH.

According to an alternative of the process disclosed, the amount of ballast that needs to be suspended in the flocculation tank in order to obtain treated water of said predetermined quality is determined on the basis of the concentration Y of ballast necessary for said so-called "overall SS" concentration X calculated according to the formula I: $Y=aX^b+c$ (in which a is between 0.4 and 1, b is between 0.3 and 1 and c is between 0 and 2) and on the basis of the approximate volume of water present in said plant.

The process proposed preferably includes a step also consisting of continuously adjusting the amount of said flocculating reagent dispensed into said flocculation zone according to said concentration of ballast that needs to be implemented in order to obtain treated water of a predetermined quality.

Said step consisting of extracting the mixture of sludge and ballast from the bottom portion of said settling zone and routing it to an intermediate mixing zone is preferably performed using at least one endless screw. Such an endless screw enables much more regular routing of the mixture of sludge and ballast coming from the bottom portion of the settling tank to the intermediate zone, which the use of a simple pipeline with a pump would not allow.

According to an advantageous alternative, the process also includes a step consisting of adjusting the flow rate of the sludge coming from the overflow of the hydrocyclone separation step, recirculated to said intermediate mixing zone so as to maintain a predetermined level of sludge and ballast in said intermediate mixing zone.

In such a case, the process also preferably includes a step consisting of storing the sludge coming from the overflow of the hydrocyclone separation step in a tank having an overflow pipe, measuring the level of sludge and ballast mixture present in the intermediate mixing zone, and releasing at least some of said sludge in the tank into said intermediate mixing zone when the measured value is lower than a predetermined threshold.

According to a preferred aspect of the technique disclosed, said step of hydrocyclone separation of the sludge and ballast mixture coming from said settling zone is performed by implementing an injection of additional liquid tangentially to said sludge.

Said additional liquid is injected in an amount corresponding to 5 to 100% by volume, and typically 5 to 20% of the volume of the sludge and ballast mixture introduced in the hydrocyclone separation step.

The use of such an additional liquid makes it possible to obtain a cleaner ballast in the hydrocyclone underflow, essentially free of the gangue of impurities surrounding it when it enters the hydrocyclone.

According to an alternative of the process described, said step consisting of contacting, in a flocculation zone, said water, at least one ballast constituted by at least one insoluble granular material heavier than water, and at least one flocculating reagent in order to allow floc to form, includes:
a step consisting of defining, in the flocculation zone, by means of a fully immersed flow-guide structure, an internal zone in which, by agitation, a turbulent axial flow is created of the mixture of the water to be treated, the ballast and the flocculant in an axial direction of said flow-guide structure,
a step consisting of injecting said flocculating reagent by means of a hydraulic distribution device in said axial flow,
a step consisting of distributing this flow, by means of a static device opposing the rotation of said flow and arranged at the outlet of this flow-guide structure;
a step consisting of allowing said mixture to circulate in a peripheral zone surrounding said flow-guide structure, in an opposite direction up to the inlet of said internal zone; and
a step consisting of moving said mixture to said settling zone.

The use of agitation means provided in the internal zone defined by the flow-guide structure allows for an intense mixture of the ballast with the flocculant and the suspended solid involved in a good formation of floc in the peripheral zone. The partition of the flocculation zone into an internal zone and a peripheral zone makes it possible to prevent the mechanical destruction of this floc by the agitation means from which the floc is protected by the flow-guide structure.

The process preferably includes a step consisting of converting the flow leaving said flow-guide structure into an axial flow by means of a flow-distributing static device. This device can be separate from the flow-guide structure, for example attached to the base of the flocculation zone. However, the flow-distributing static device will preferably be provided within the actual flow-guide structure.

The process described makes it possible to provide a contact time between the water to be treated, the flocculating reagent and the ballast in said flocculation zone, from one to several minutes.

Said ballast is preferably microsand with a mean diameter of between around 20 and 400 micrometers.

According to an alternative of the process, a granular material with adsorption properties, such as active carbon powder, or a granular material with ion or molecule exchange properties, such as a resin, is introduced into the flocculation zone or upstream of the flocculation zone so as to allow for a sufficient contact time of said material with the water to be treated.

This material may, where appropriate, constitute said ballast or a second ballast.

The settling step of the process is preferably a lamellar settling step.

The invention also relates to any plant for implementing such a process, including:
- at least one flocculation tank provided with at least one agitator;
- a pipeline supplying water to be treated in said flocculation tank;
- a settling tank provided with an outlet for the treated water in the bottom part;
- a pipeline connecting the bottom portion of the settling tank to an intermediate tank provided with at least one agitator;
- a pipeline connecting said intermediate tank to a hydrocyclone;
- a pipeline for recirculation of some of the overflow of the hydrocyclone to said intermediate tank;

characterised in that it includes:
- at least one first sensor intended to continuously measure at least one parameter representing the concentration of impurities in the water entering said plant;
- a calculator making it possible to continuously deduce, from measurements taken by said first sensor, the amount of ballast that must be implemented in order to obtain treated water of a predetermined quality.

Such a plant preferably includes at least one second sensor provided in said flocculation tank or in said intermediate tank or at the level of said pipeline connecting said intermediate tank to said hydrocyclone making it possible to continuously measure the ballast concentration in the mixture passing through one of them, and in that said calculator makes it possible to continuously deduce, from the measurements taken by said second sensor, the amount of ballast actually present in said plant.

Such a plant advantageously includes an automatic ballast-refilling device.

Said calculator is preferably designed to continuously deduce, from the measurements taken by said first sensor, the amount of flocculating reagent that needs to be implemented in order to obtain treated water of said predetermined quality.

According to an alternative, the plant also includes an automatic flocculating reagent dispenser connected to said calculator.

Said first sensor is preferably a sensor measuring the concentration in the raw water of suspended solids and/or the concentration in the raw water of organic matter such as the concentration of total organic carbon in said water.

According to an alternative, the plant includes at least one sensor intended to continuously measure the quality of the water treated by said plant. In other alternatives, this measurement can be performed only from time to time, and manually, as the case may be.

Said pipeline supplying water to the flocculation tank is preferably equipped with a static mixer for mixing the water to be treated with a coagulating reagent.

Said discharge of the treated water from said settling tank advantageously includes at least one spillway or a perforated tube.

Said settling tank is preferably equipped at its inlet with a siphoniform partition.

Also preferably, said settling tank is equipped at its inlet with a splitting structure. The latter advantageously includes at least two plates parallel to one another arranged on each side of a submerged spillway provided between the flocculation tank and the settling tank, and plates arranged parallel to one another between the other plates, overlapping said submerged spillway, said transverse plates constituting, with the other plates, the same number of flow channels between the flocculation tank and the settling tank.

According to an advantageous alternative, said pipeline connecting the bottom portion of the settling tank to said intermediate tank is equipped with an endless screw.

According to another alternative, the plant includes a tank provided with an overflow pipe provided on said pipeline for recirculation of some of the hydrocyclone overflow to said intermediate tank, and preferably a valve provided on said pipeline for recirculation of some of the hydrocyclone overflow to said intermediate tank, said valve being provided downstream of said tank.

Also preferably, the plant includes a sensor that senses the level of the sludge and ballast mixture present in said intermediate tank.

According to an alternative, the hydrocyclone used in the plant described has a cylindrical portion provided with at least one tangential supply of the sludge and ballast mixture to be treated and a conical portion, and, at the outlet of the conical portion, an additional liquid injection chamber having a tangential supply of additional liquid.

According to an alternative, the plant proposed includes at least one dispenser of a material having ion or molecule exchange or adsorption properties in said flocculation tank.

Said settling tank is preferably a lamellar settling tank provided with vertical blades according to one alternative.

According to an advantageous feature, said flocculation tank preferably comprises a flow-guide structure, open at its two ends and arranged at a distance from the base of said tank defining a median zone equipped with said agitator and a peripheral zone and a static device distributing the flow leaving said flow-guide structure. This flow-guide structure is preferably a tube with a circular cross-section arranged vertically at a distance from the base of said flocculation tank.

According to an advantageous alternative, such a static device is integrated in the lower portion of the flow-guide structure, preferably at least 200 mm below the agitator. Said device is advantageously constituted by at least one diametral plate of height H defining at least two compartments. Said compartments formed by said at least one plate preferably have surfaces that are substantially equal, and the theoretical width B of each compartment is chosen so that there is a ratio H/B between the height H of said at least one plate and said theoretical width B between around 1 and around 2, typically equal to around 1.5.

BRIEF DESCRIPTION OF THE DRAWINGS

The invention, as well as the various advantages that it has, can be more easily understood from the following detailed description of two preferred embodiments provided in reference to the figures, in which.

Figure 1:
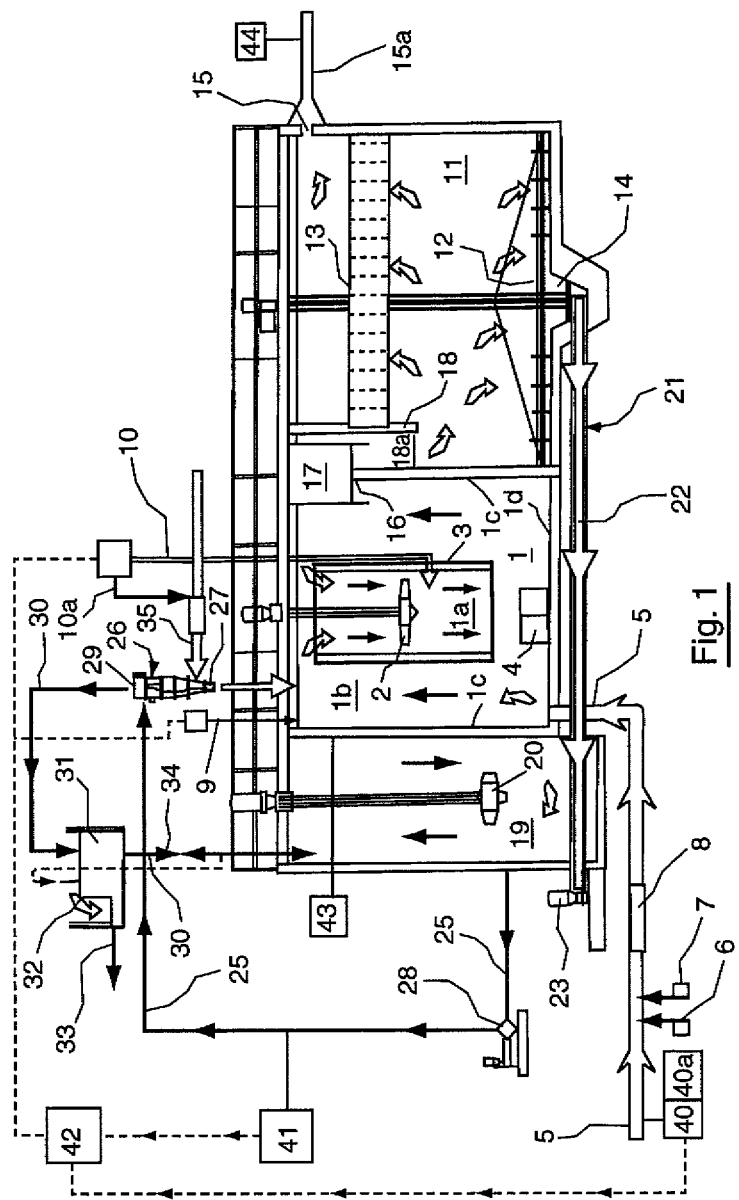
FIG. 1 shows a diagrammatic cross-section view of a first embodiment of a plant according to this invention.

In reference to FIG. 1, the embodiment example described here has a flocculation tank 1 provided with a mechanical agitator 2. This mechanical agitator 2 includes a rotatably-mounted vertical pin plunging into the tank and equipped with blades at its ends.

The flocculation tank 1 in the preferred embodiment described here has an essentially parallelepiped shape, but can have other shapes, in particular circular, in other embodiments.

This flocculation tank 1 is equipped, in its central portion, with a flow-guide structure constituted by a cylindrical flow-guide tube 3 receiving the agitator 2. Said flow-guide tube 3 is provided at a distance from the base of the tank and defines therein an central internal zone 1a, constituted by the hole of the flow-guide tube 3, and a peripheral zone 1b, between the external wall of said flow-guide tube 3 and the lateral walls 1c of the flocculation tank 1.

This flocculation tank 1 is also equipped, at the outlet of the flow-guide tube 3, and at a distance therefrom, with a static flow-distributing device 4 attached to its bottom wall 1d.

Figure 2:
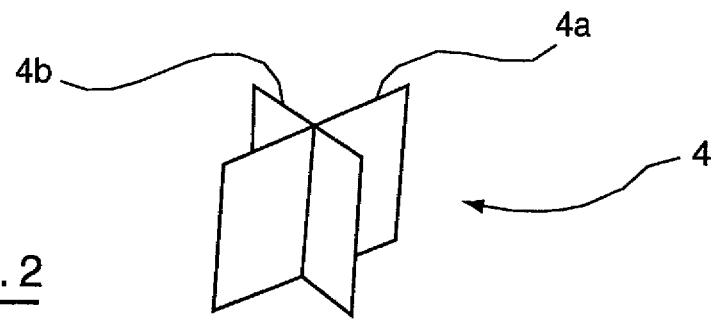
FIG. 2 shows an upper perspective view of the flow-distributing device provided at the outlet of the flow-guide tube of the plant shown in FIG. 1.

This static device 4 is shown in perspective in FIG. 2. As can be seen in the figure, it is constituted by the association of two plates 4a and 4b together forming a cross.

It is noted that in other embodiments, this static device can be provided at the outlet of the flow-guide tube, but integrated therein instead of being provided at a distance therefrom and attached to the base.

The plant described in FIG. 1 also includes a pipeline 5 supplying water to be treated to the flocculation tank described above, said pipeline 5 joining the lower portion of said tank.

This pipeline 5 is equipped with a coagulating reagent injection means 6, such as an injector, a coagulating reagent, for example, iron chloride, a pH adjusting injection means 7, such as an injector, a reactor enabling the pH to be adjusted, for example lime, and a static mixer 8 making it possible to mix the reagents brought to the pipeline by means 6 and means 7 with raw water so as to obtain, at the inlet of the flocculation tank, coagulated water with a predetermined pH.

The plant described in FIG. 1 also includes a ballast dispensing means 9, such as a dispenser, a granular material constituting a ballast, such as microsand, in the flocculation tank 1, and a flocculating reagent dispensing means 10, such as a dispenser, and a flocculating reagent, such as, for example, a polymer, in this same flocculation tank.

More specifically, the means 10 make it possible to dispense the flocculating reagent inside the flow-guide tube 3 in a portion thereof located below the blades of the agitator 2.

The plant also includes a lamellar settling tank 11, provided downstream of the flocculation tank. In the context of this preferred embodiment, to enhance the compactness of plant, the settling tank has a wall 1c shared with the flocculation tank, said shared wall being equipped with a submerged spillway 16 equipped with a splitting structure 17. The settling tank 11 is equipped with a siphoniform partition 18 forming, with said submerged spillway 16 and said splitters, a passage 18a between the flocculation tank 1 and the settling tank 11.

Figure 3:
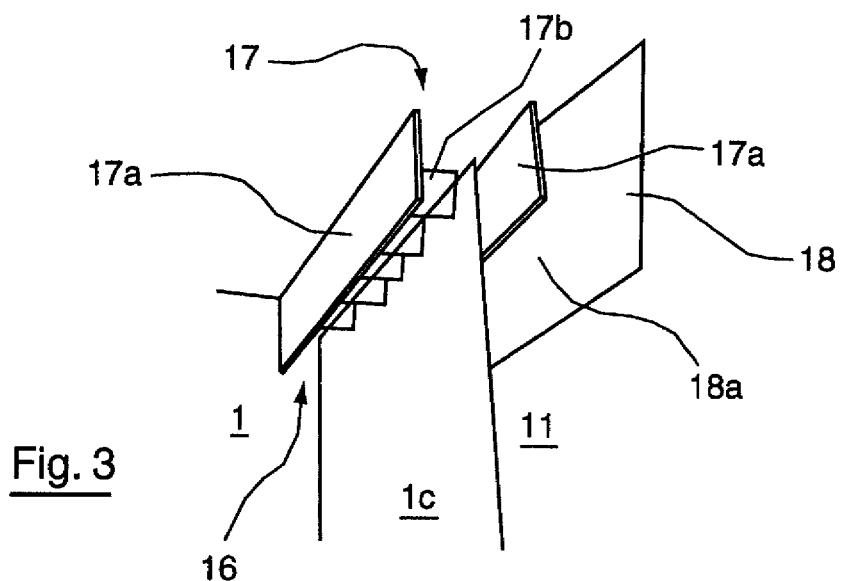
FIG. 3 shows a lower partial perspective view of the splitting structure provided on the submerged spillway between the flocculation tank and the settling tank of the plant shown in FIG. 1.

This passage 18a is described in greater detail in reference to FIG. 3.

As can be seen in FIG. 3, the wall is shared by the flocculation tank 1 and the settling tank 11 is equipped in its upper portion with a submerged spillway 16. Said submerged spillway 16 is equipped with a splitting structure 17. More specifically, this structure is constituted by two parallel plates 17a arranged on each side of the submerged spillway 16, and parallel plates 1ib arranged between the other plates 17a, overlapping the submerged spillway 16. These transverse plates 17b constitute, with plates 17a, the same number of flow channels between the flocculation tank 1 and the settling tank 11. These channels communicate with the passage 18a, which is defined by the siphoniform partition provided in the settling tank 11.

In reference to FIG. 1, the settling tank 11 of the plant is equipped in its lower portion with a rotating device 12 for scraping sludge, and in is upper portion with horizontal blades 13.

The prior art indeed proposed tilting the blades of the lamellar settling tanks used in the context of water treatment plants using ballasted floc so as to promote the settling of the floc. However, the inventors have discovered that the feature whereby verticals blades are provided in the settling tank did not adversely affect the settling of the floc and had the advantage of facilitating the handling of these plates. It is noted, however, that in other embodiments, the settling tank may have tilted blades or be blade-free.

The settling tank 11 has, in its bottom portion, a discharge channel 14 for sludge decanted therein, and, in its upper portion, a discharge outlet 15 for the treated water, constituted in this embodiment by a simple spillway. The treated water coming from this spillway is picked up by a pipeline 15a on which a sensor 44 is provided, making it possible to take continuous or periodic measurements of one or more parameters relating to the quality of the treated water. It is noted that in other embodiments of the invention, such measurements relating to the quality of the treated water can be obtained manually.

Still in reference to FIG. 1, the plant according to this invention also includes a so-called "intermediate tank" or a mixing tank 19, equipped with an agitator 20 constituted by a rotating pin on which the blades are mounted.

In this embodiment, for reasons of compactness, this intermediate tank 19 is attached to the flocculation tank 1. However, the base of this intermediate tank 19 is at a lower level than that of the flocculation tank 1.

The plant shown in FIG. 1 also includes a pipeline 21 connecting the channel 14 of the settling tank 11 to the inside of the intermediate tank 19. This pipeline 21 is equipped with an endless screw 22, the rotation of which is controlled by a motor 23.

The plant also includes a pipeline 25 provided with a pump 28 connecting the intermediate tank 19 to a hydrocyclone 26 of which the underflow 27 is provided above the flocculation tank 1.

The overflow 29 of the hydrocyclone 26 is connected to a recirculation pipeline 30 joined above the intermediate tank 19. A tank 31 is provided on this recirculation pipeline 30 and equipped with an overflow pipe 32 as well as a discharge pipeline 33 for this overflow pipe. The portion of the pipeline 30 provided downstream of this tank 31 is equipped with a valve 34.

The intermediate tank 19 is also equipped with a sensor 43 that senses the level of the sludge and ballast mixture present in the tank 19. This sensor 43 is connected to the valve 34.

According to this preferred embodiment, the plant also includes a pipeline supplying service water 35 to the underflow 27 of the hydrocyclone. This pipeline is equipped with means 10a for supplying the flocculating reagent, making it possible to optimise the mixture of the latter with the ballast. The hydrocyclone is shown in greater detail in the cross-section of FIG. 4.

Figure 4:
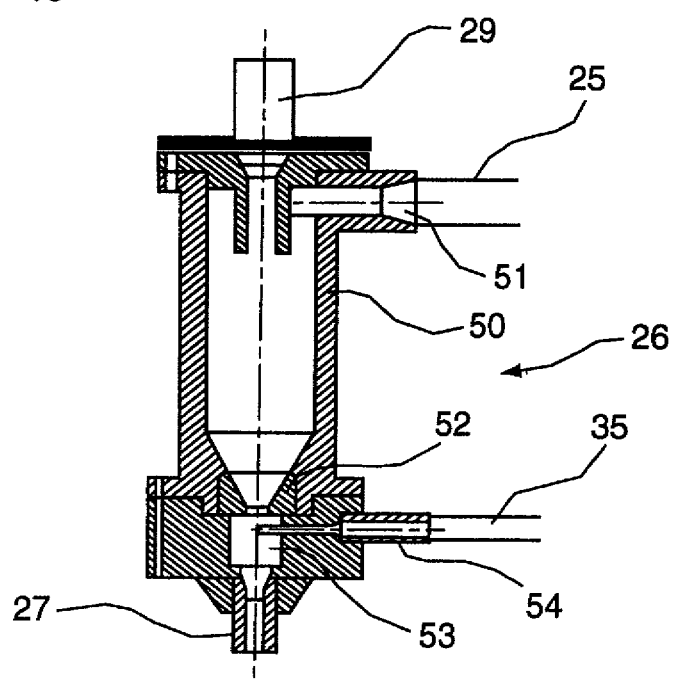
FIG. 4 shows a cross-section view of the hydrocyclone of this plant.

In reference to FIG. 4, the hydrocyclone 26 includes a cylindrical portion 50 provided in its upper portion with a tangential supply of suspension to be treated. This tangential supply is connected to the recirculation pipeline 25.

The hydrocyclone 26 also includes a conical portion 52 extending from the cylindrical portion 50, and which communicates with a cylindrical chamber 53. The cylindrical chamber 53 has a tangential supply 54 that communicates with the service water supply pipeline 35 mentioned above. The cylindrical chamber 53 communicates with the underflow 27 of the hydrocyclone. The overflow 29 of the hydrocyclone is provided in the upper portion of the cylindrical portion 50.

In reference to FIG. 1, the plant described includes sensors 40, 40a intended to continuously measure parameters representing the concentration of impurities in the raw water to be treated, entering the flocculation tank 1. These impurities may be of different types and/or in different forms (suspended solids, colloidal matter, dissolved matter, microorganisms, micropollutants, and so on). The parameters measured can be, for example, the concentration of suspended solids in the raw water or the concentration of organic matter in said raw water, measured as the TOC (total organic carbon), or the UV absorbency at 254 nm or the COD (chemical oxygen demand) or the oxygen consumed-permanganate ($KmnO_4$) or any other measurement making it possible to accurately estimate the OM (in particles or dissolved).

As will be explained below in greater detail, the measurement of these parameters, taken by sensors 40, 40a will be used to deduce the so-called "overall SS" concentration of the water entering the flocculation tank 1.

It is noted that in the embodiment described in FIG. 1, these sensors 40, 40a are provided upstream of the static mixer 8 provided on the pipeline 5 for supplying water to be treated to the flocculation tank 1. The measurements taken by the sensors 40, and 40a are therefore done on raw water. However, it is also possible to envisage in other embodiments, taking measurements on the coagulated water, and therefore placing a corresponding sensor downstream of the water coagulation means.

The plant described also includes a sensor 41 provided at the level of the pipeline 25 connecting the intermediate tank 19 to the hydrocyclone 26. This sensor 41 makes it possible to continuously measure the ballast concentration (in the context of this embodiment example, microsand) of the mixture of ballast and sludge passing through this pipeline 25. Such a ballast concentration corresponds to the ballast concentration present in the intermediate tank 19 and is proportional to the ballast concentration of the mixture of water, ballast and polymer present in the flocculation tank 1.

It is also noted that in other embodiments, this ballast concentration sensor can be provided either in the intermediate tank 19 or in the flocculation tank 1.

The plant also includes a calculator 42 making it possible to collect the measurements taken by sensors 40, 40a and 41.

The operation of the plant described above in reference to FIGS. 1 to 4 is as follows.

Raw water to be treated arrives by the pipeline 5. Coagulating reagent (for example, iron chloride) and reagent intended to adjust the pH (for example, lime) are injected in predetermined amounts into this raw water, by means 6 and 7 respectively, and mixed therewith by the static mixer 8 so that the water arriving in the flocculation tank 1 is coagulated and has an optimised pH according to the type of coagulant chosen.

The coagulated water arriving in the lower portion of the flocculation tank 1 follows an ascending path into the peripheral zone 1b thereof defined by the lateral walls 1b of the flocculation tank 1 and the external walls of the flow guide tube 3 (as show in FIG. 1 by the arrows pointing upward in the flocculation tank 1), before penetrating said flow-guide tube 3 through its upper opening and following a descending movement into the central internal zone 1a defined by the hole of said flow guide tube 3 (as shown in FIG. 1 by the arrows pointing downward in the flow guide tube 3).

It is noted that in other embodiments, the coagulated water may arrive in the upper portion of the flocculation tank, with its flow then following a descending movement into the peripheral zone and an ascending movement into the internal zone.

When it descends into the flow-guide tube 3, the coagulated water follows a descending movement with a horizontal radial component due to the movement of the blades of the agitator 2.

As it leaves the flow-guide tube 3 through the lower outlet thereof, the flow reaches the static flow-distributing device 4. This static flow-distributing device 4, by its configuration, makes it possible to strongly attenuate the radial component of the flow coming from the flow-guide tube 3 and to distribute this flow in a substantially even manner in the entire peripheral zone 1b of the flocculation tank 1.

With the ballast dispensing means 9, an amount of ballast, calculated as indicated below, is dispensed into the water present in the flocculation tank 1.

With the flocculating reagent dispensing means 10, an amount of flocculating reagent, calculated as indicated below, is continuously dispensed inside the flow-guide tube 3 in the same water.

With the flow-guide tube 3 and the agitator 2, the mixture of said polymer and the microsand with the water is optimised.

In the flocculation tank 1, floc constituted by ballast is formed, and the impurities contained in the water agglutinate around said floc, owing to the flocculating reagent. The improvement of the mixture of water and ballast and the flocculating reagent makes it possible to optimise the formation of floc as well.

With the sensors 40 and 40*a*, respectively, the suspended solids content and the concentration of organic matter (OM) in the raw water are measured continuously.

The corresponding measurements are sent to the calculator 42, which combines these measurement of the data concerning the predetermined amounts of coagulating reagent and the reagent intended to adjust the pH used and the concentration of microalga in the raw water so as to deduce or determine a concentration of so-called "overall SS" in the coagulated water entering the flocculation tank 1, representing the concentration of pollutants to be removed, contained in said water.

The calculator 42 then calculates the amount of flocculating reagent that needs to be implemented in the plant by means 9, according to:
the flow rate of the raw water to be treated arriving in the plant through the pipeline 5,
said so-called "overall SS" concentration in the water arriving in the flocculation tank 1,
the particle size of the granular material constituting the ballast.

The calculator 42 calculates the amount of ballast that needs to be implemented in the plant in order to obtain treated water of a predetermined quality, said amount corresponding to a minimum ballast concentration in the flocculation tank.

In the context of this embodiment example, said ballast concentration Y is calculated by the calculator 42 using the formula:

$$Y = 0.4208 \times X^{0.3667}$$

in which X corresponds to the "overall SS" concentration.

In other embodiments, other methods for calculating this ballast concentration can be envisaged.

After having passed through the flocculation tank 1, the mixture formed by water and floc enters the settling tank 11 by passing over the submerged spillway 16.

During this passage, said mixture passes through channels defined by plates 17, 17*a* of the splitting structure described in reference to FIG. 3.

This structure makes it possible to obtain, at the outlet of said channels, a flow of the mixture of water and floc that is better distributed over the length of the submerged spillway 16.

This mixture then passes through the passage 18*a* defined by the submerged spillway 16 and the siphoniform partition 18 to arrive in the settling tank 11.

In the settling tank 11, the floc formed by matter aggregated around the ballast settles and accumulates on the bottom wall of the settling tank 11 to form a mixture of sludge and ballast. This settling is improved by the presence of blades 13 provided in the upper portion of the settling tank 11.

The rotating scraping device 12 makes it possible to direct this mixture of sludge and sand into the channel 14 of the settling tank 11.

The treated water free of its impurities is discharged into the upper portion of the settling tank 11 by the discharge outlet 15.

The mixture of sludge and ballast present in the channel 14 of the settling tank 11 is extracted from said channel 14 through the pipeline 21 by means of the endless screw 22 provided in the pipeline 21, which endless screw is actuated by the motor 23.

This sludge and ballast mixture is routed at a primarily constant speed into the intermediate tank 19. This routing is facilitated by the fact that the base of the tank 19 is provided at a level lower than that of the flocculation tank 1, which enables the pipeline 21 to pass below it.

The sludge and ballast mixture is mixed by agitation means 20 provided in the tank 19, in which it follows an ascending, then descending movement (as indicated by the arrows pointing upward and downward).

This sludge and ballast mixture is continuously extracted from the intermediate tank 19 through the pipeline 25 by means of the pump 28 so as to be routed toward the hydrocyclone 26 intended to separate the ballast from the sludge contained in said mixture.

This separation is improved by the injection, through the pipeline 25, of service water into the hydrocyclone. This injection of service water makes it possible to obtain, in the underflow 27 of said hydrocyclone 26, a ballast that is essentially free of organic matter. The ballast recovered in the underflow of the hydrocyclone 27 is redistributed in the flocculation tank 1.

The overflow 29 of the hydrocyclone 26, constituted by diluted sludge, is routed through the pipeline 30 to the tank 31 provided thereon. Said diluted sludge accumulates in said tank 31. A part of said diluted sludge is discharged through a pipeline 33 connected to an overflow pipe 32 provided in said tank, while another part is rerouted by way of the pipeline 30 to the intermediate tank 19. However, this recirculation is implemented only when the level of mixture present in the tank 19 and detected by the sensor 43 is lower than a predetermined value. In this case, the valve 34 provided on the pipeline 30 opens to release some of the contents of tank 31 into tank 19 and closes when the sensor 43 detects that the level of mixture in said tank 19 has reached the predetermined value.

This mechanism makes it possible to maintain an essentially constant ballast concentration in the tank 19.

The sensor 41 continuously measures this concentration and transmits it to the calculator 42, which deduces the amount of ballast actually present in the plant.

If this amount is lower than or excessively lower than the amount of ballast needed to obtain a predetermined water quality (amount calculated as indicated above from the ballast concentration Y), in other words, if this amount falls below a predetermined value, the calculator 42 commands the dispensing means 9 to automatically fill the plant with an additional amount of ballast so as to obtain said necessary amount.

Figure 5:
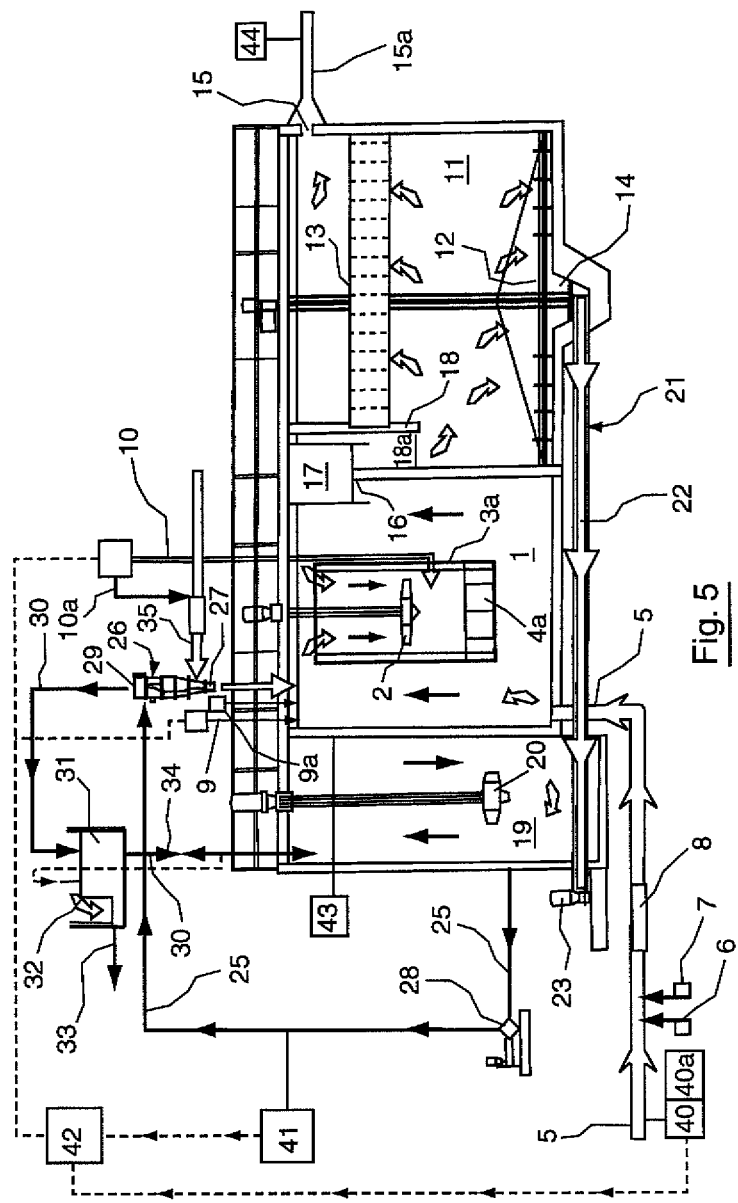
FIG. 5 shows a diagrammatic cross-section view of a second embodiment of a plant according to this invention.
Figure 6:
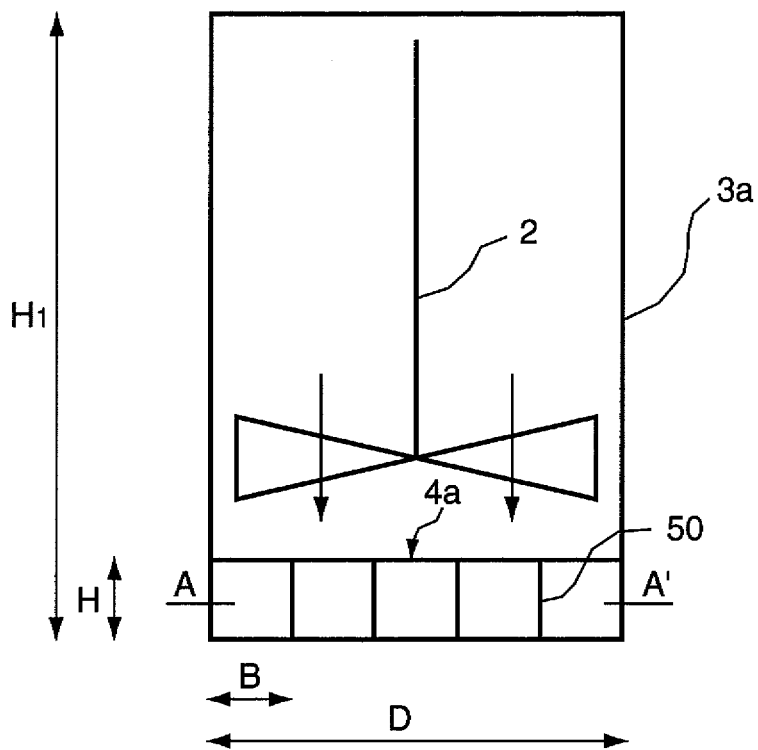
FIG. 6 shows a cross-section view of the flow-guide tube and its integrated flow distributor of the plant shown in FIG. 5.
Figures 7, 8, 9:
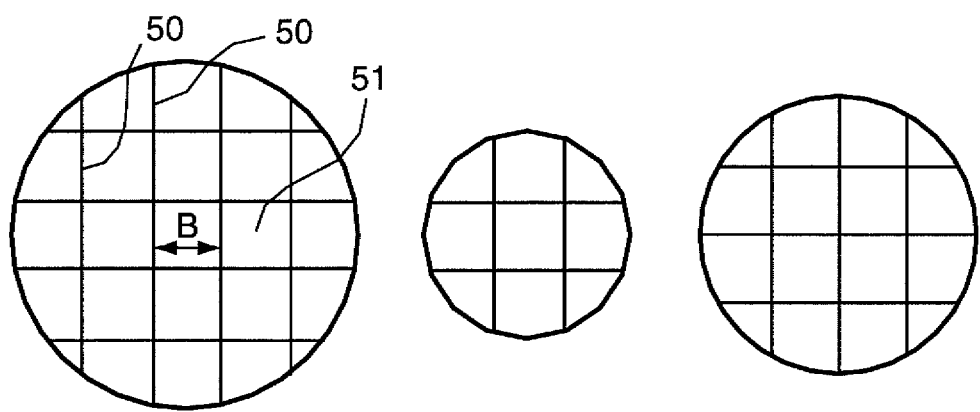
FIG. 7 shows a cross-section view AA' of said flow distributor.
FIGS. 8 and 9 show cross-section views of other embodiments of a flow distributor.

A second embodiment example is shown in reference to FIGS. 5 to 7.

The plant described in FIG. 5 is completely identical to that shown in FIG. 1, except that:
its flocculation tank 1 is equipped with a flow-guide tube 3*a* including a flow distributor 4*a*;
and in that it includes a dispenser 9*a* of a second granular material (material having adsorption properties, or ion or molecule exchange properties) in the flocculation tank 1.

In reference to FIG. 6, the flow distributor included in the tube is positioned more than 200 mm below the agitator 2 and is constituted by the association of 8 plates 50 together forming a plurality of crosses, defining 25 channels 51 allowing for the passage of the fluid leaving the tube 3.

In reference to FIGS. 8 and 9, this flow distributor can be constituted by a number of plates other than 8, for example 4 (FIG. 8) or 9 (FIG. 9).

The ratio between the height H of the plates 50 and their maximum width B is preferably between 1.5 and 2.

The invention claimed is:

1. A method of treating wastewater including:
   a. measuring a concentration of pollutants in the wastewater to form a measurement of pollutants in the water;
   b. directing the wastewater to a ballasted flocculation system;
   c. forming a sludge-ballast mixture in the ballasted flocculation system;
   d. separating ballast from the sludge-ballast mixture and recirculating the separated ballast into the ballasted flocculation system;
   e. determining, utilizing the measurement of pollutants in the wastewater, a ballast concentration level that is required in the system to produce a treated water of a predetermined quality;
   f. measuring the ballast concentration level in the ballasted flocculation system;
   g. when the ballast concentration level is less than the required ballast concentration level, calculating an additional amount of ballast required to be added to the system in order to increase the ballast concentration in the system to the required level; and injecting the required additional amount of ballast into the system and
   h. wherein the additional amount of ballast injected into the ballasted flocculation system is in addition to the recirculated ballast directed back to the ballasted flocculation system.

2. The method of claim 1 including continuously repeating two or more of the following steps:
   a. measuring the concentration of pollutants in the wastewater;
   b. determining the ballast concentration level that is required in the system to produce treated water of the predetermined quality;
   c. measuring the ballast concentration in the system;
   d. when the ballast concentration level is less than the required ballast concentration level, calculating the amount of ballast required to be added in order to increase the ballast concentration in the system to the required level.

3. The method of claim 1 wherein recirculating ballast includes directing the sludge-ballast mixture from a settling tank to an intermediate tank and directing the sludge-ballast mixture from the intermediate tank to a sludge separation device and separating ballast from the sludge-ballast mixture and recycling the separated ballast to the ballasted flocculation system.

4. The method of claim 1 including directing wastewater to a flocculation tank, directing ballast from a settling tank, injecting ballast from two or more sources into a flocculation tank, and mixing the injected ballast with the wastewater.

5. The method of claim 4 wherein mixing the ballast with the wastewater includes directing the wastewater into a peripheral zone of the flocculation tank, directing the wastewater and injected ballast into an interior zone within an immersed flow-guide structure; injecting a flocculating agent into the wastewater; and, mixing the wastewater and injected ballast with the flocculating agent to form a water-floc mixture.

6. The method of claim 5 including directing the water-floc mixture generally downward in the interior zone and out of the interior zone near bottom portion thereof, directing the mixture generally away from the bottom portion and thence generally upwardly through the peripheral zone, and directing at least a portion of the mixture into an upper end portion of the interior zone and generally downwardly there through.

7. The method of claim 3 including directing the sludge-ballast mixture from the settling tank to a sludge-ballast separating unit, separating ballast from the sludge-ballast mixture, and injecting the separated ballast to a flocculation tank.

8. The method of claim 7 wherein injecting the separated ballast to the flocculation tank includes directing an underflow of a hydrocyclone to the flocculation tank.

9. The method of claim 8 including forming an overflow of the hydrocyclone wherein the overflow comprises a diluted sludge, directing the diluted sludge to an accumulation tank, discharging a first portion of the diluted sludge from the accumulation tank, and intermittently directing a second portion of the diluted sludge to the intermediate tank and mixing the diluted sludge with the sludge-ballast mixture.

10. The method of claim 1 including calculating the required ballast concentration level continuously, utilizing the required ballast concentration level in continuously calculating the concentration of a flocculating agent required to obtain treated water of the predetermined quality, and, in accordance therewith, continuously adjusting an amount of flocculating agent injected.

11. The method of claim 10 including continuously injecting a coagulating reagent and a pH-adjusting reagent into the wastewater.

12. The method of claim 11 including continuously injecting one or both of the coagulating reagent and the pH-adjusting agent into the wastewater prior to directing the wastewater into the system.

13. A method of treating wastewater using a ballasted flocculation process comprising:
   a. measuring at least one property of the wastewater and determining a concentration of one or more pollutants in the wastewater;
   b. calculating, based on the concentration of one or more pollutants in a wastewater, a required ballast concentration level in a flocculation tank to obtain a predetermined quality of the treated water;
   c. directing the wastewater into the flocculation tank and injecting a ballast and a flocculating reagent into the wastewater;
   d. forming a water-floc mixture in the flocculation tank, the water-floc mixture comprising ballasted flocs;
   e. directing the water-floc mixture into a settling tank, settling at least some of the ballasted flocs, and forming a sludge-ballast mixture in the settling tank;
   f. directing at least a portion of the sludge-ballast mixture from the settling tank into an intermediate tank and therein agitating the sludge-ballast mixture;
   g. directing the sludge-ballast mixture from the intermediate tank to an inlet of a hydrocyclone;
   h. using the hydrocyclone to separate ballast from the sludge-ballast mixture and recirculating the separated ballast by directing the separated ballast into the flocculation tank;
   i. determining a ballast concentration level in the flocculation tank and determining whether the ballast concentration level in the flocculation tank is sufficient to obtain the predetermined quality of the treated water;
   j. if needed, calculating an additional amount of ballast required to be injected to increase the ballast concentration level in the flocculation tank to a level sufficient to obtain the predetermined quality of treated water; and,
   k. if needed, injecting the amount of additional ballast into the flocculation tank with the recirculated ballast.

14. The method of claim 13 including continuously repeating two or more of the following steps:

a. calculating the required ballast concentration in the flocculation tank to obtain the predetermined quality of the treated water;
b. determining the ballast concentration in the flocculation tank and determining whether the ballast concentration in the flocculation tank is sufficient to obtain the predetermined quality of the treated water;
c. calculating an amount of additional ballast required to increase the ballast concentration in the flocculation tank to a level sufficient to obtain the predetermined quality of treated water; and,
d. injecting the amount of additional ballast into the flocculation tank.

15. The method of claim 13 including discharging a first portion of a diluted sludge overflow from the hydrocyclone and selectively directing a second portion of the diluted sludge overflow from the hydrocyclone to the sludge-ballast mixture in the intermediate tank.

16. The method of claim 15 wherein selectively directing the second portion of the diluted sludge overflow to the sludge-ballast mixture in the intermediate tank includes determining the level of the sludge-ballast mixture in the intermediate tank, opening a valve to direct the second portion into the intermediate tank while the level of sludge-ballast mixture in the intermediate tank is lower than a predetermined value, and closing the valve upon the level reaching the predetermined value.

17. The method of claim 13 wherein determining the ballast concentration in the flocculation tank includes measuring a ballast concentration in the sludge-ballast mixture and calculating the ballast concentration in the flocculation tank using a known proportionality.

18. The method of claim 13 wherein calculating the required ballast concentration in the flocculation tank to obtain the predetermined quality of the treated water includes utilizing the equation:

$$Y=aX^b+C$$

wherein
Y is the ballast concentration necessary to obtain treated water of a predetermined quality,
a is between about 0.4 and 1,
b is between 0.3 and 1, C is between 0 and 2, and
X is measured concentration of one or more pollutants in the wastewater.

* * * * *